United States Patent Office 2,757,146
Patented July 31, 1956

2,757,146
PYROLYSIS POLYMERS FROM p-METHYL QUATERNARY BENZYLAMMONIUM HYDROXIDES

Frank S. Fawcett, Wilmington, Del., assignor to E. I. du Pont de Nemours and Company, Wilmington, Del., a corporation of Delaware No Drawing. Application September 8, 1952,
Serial No. 308,507

7 Claims. (Cl. 260—2)

This invention relates to a new method of preparing polymers containing intralinear aromatic nuclei. More particularly, it relates to a method of preparing polyarylenethylenes and halogenopolyarylenethylenes through a new reaction involving a quaternary ammonium base as the starting material.

Polyarylenethylenes, i. e., polymers containing recurring units of the type

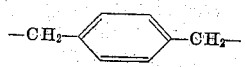

can be prepared by pyrolysis of 1,4-dimethylarylenes such as p-xylene at very high temperatures (M. Szwarc, Nature 160, 403 (1947); Faraday Society Discussions 2, 46 (1947); J. Chem. Phys. 16, 128 (1948); and particularly J. Pol. Sci. 6, 319 (1951)). These polymers are characterized by high melting points and good stability towards physical or chemical agents.

Thermal decomposition of tetraalkylammonium hydroxides gives a trialkylamine and other reaction products whose nature depends upon that of the alkyl groups. If one or more of the alkyl groups has two or more carbon atoms, there is normally obtained the alkene of the same structure, and water. Thus, tetraethylammonium hydroxide gives on thermal decomposition triethylamine, ethylene and water, rather than thriethylamine and ethanol. If, however, the hydrocarbon groups are of such nature that elimination of water from the corresponding alcohol is not possible, then the reaction products are a tertiary amine and an alcohol. For example tetramethylammonium hydroxide gives trimethylamine and methanol. Similarly, decomposition of benzyltrimethylammonium hydroxide gives principally trimethylamine and benzyl alcohol (see J. Chem. Soc. 57, 778 (1890)).

This invention has as an object the preparation of polymers having recurring benzene rings. A further object is the provision of a process for the preparation in higher yields of polymeric products. Another object is a process employing relatively mild conditions. Other objects will appear hereinafter.

These objects are accomplished by the process of the present invention wherein a quaternary ammonium hydroxide compound of the formula

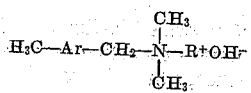

where Ar is an arylene or haloarylene radical attached to the methyl and methylene groups through the 1 and 4 carbon atoms of a six-membered nucleus and R is methyl or phenyl, is subjected to thermal decomposition until the evolution of tertiary amine is substantially completed.

The reaction of the process of this invention is represented by the overall equation

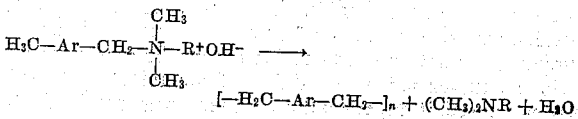

The reaction mechanism is not known with certainty. Since polymer is formed in the apparatus at some considerable distance from the reaction vessel proper, it may be that a voltatile, reactive monomer such as p-xylylene

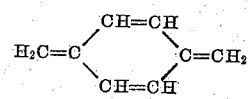

is formed by elimination and rearrangement and that it subsequently polymerizes.

The thermal decomposition of the quaternary ammonium hydroxide is carried out simply by heating this material at a temperature above about 45° C. The maximum temperature is not critical since the principal nonvolatile reaction product, the polyarylenethylene (or halogenopolyarylenethylene), has good heat stability. Nevertheless, it is obviously desirable to keep the decomposition temperature as low as possible, preferably below 250° C. A satisfactory temperature range for rapid and substantially complete decomposition is between 60 and 225° C.

The reaction is conveniently carried out in an apparatus designed to provide easy removal of the volatile reaction products and condensation of the tertiary amine, i. e., trimethylamine or N,N-dimethylaniline, which can be used again for preparation of the starting quaternary ammonium base. The removal of the volatile products is facilitated by operating under reduced pressure. The pressure can be as low as conveniently obtainable. During the decomposition, the evolution of volatile materials increases the pressure within the system. This increase in pressure, followed by return to the initial low pressure, can serve to indicate the progress and the end of the reaction.

The quaternary ammonium hydroxides are normally prepared in a solvent, which can be, for example, water or a lower aliphatic alcohol such as methanol or ethanol. It is unnecessary to isolate the quaternary ammonium base from its solution. On the contrary, it is preferred to place the solution directly in the reaction vessel, remove the solvent by distillation under reduced pressure at relatively low temperature, then heat the residue under reduced pressure until gas evolution has substantially ceased. Another preferred method is direct flash distillation of the solution from a hot surface under atmospheric or reduced pressure.

At the end of the recation, the residual material in the reaction vessel is conveniently treated or extracted with an organic solvent such as methanol or acetone to separate the difficultly soluble polyarylenethylene or halogenopolyarylenethylene from unchanged starting materials and by-products. It is generally obtained as a light colored solid which is suitable as such for the preparation of pressed films or other structures.

The following examples in which parts are by weight are illustrative of the invention.

Example I p-Methylbenzyltrimethylammonium chloride,

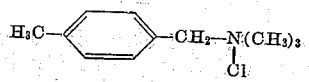

was prepared by the following procedure, which is an adaptation of the method used by Collie and Schryver (J. Chem. Soc. 57, 778 (1890)) to prepare the corresponding benzyl derivative. To a stirred solution of 30 parts of trimethylamine in 60 parts of absolute ethanol at 10–30° C. was added gradually 50 parts of p-methylbenzyl chloride (B. P. 46–48° C. at 0.5 mm. pressure, prepared by the chloromethylation of toluene). During this addition, the temperature of the reaction mixture was maintained below 30° C. by external cooling. After the addition was completed, the solution was heated at 35–45° C. for 45 minutes, then concentrated under reduced pressure to remove the excess amine and a portion of the solvent. After cooling, diethyl ether was added to the residue, whereby a white precipitate of p-methylbenzyltrimethylammonium chloride formed. This was separated by filtration, washed with ether and dried under reduced pressure. The yield was 60 parts, or 86% of the theory. p-Methylbenzyltrimethylammonium chloride is a hygroscopic solid, M. P. 194–196° C. after crystallization from a mixture of acetonitrile and propionitrile. A sample was found by analysis to contain 17.84% chlorine and 6.95% nitrogen (calculated for $C_{11}H_{18}NCl$: Cl, 17.76%; N, 7.02%).

A solution of 34.5 parts of p-methylbenzyltrimethylammonium chloride in 200 parts of methanol was treated with the freshly precipitated and washed silver oxide obtained from 36 parts of silver nitrate and 9.7 parts of sodium hydroxide. The initial portion of the silver oxide caused precipitation of silver chloride and, after all had been added, a temperature rise of from 21 to 34° C. was observed. The suspension was heated at 45–50° C. for four hours with stirring, after which the mixture was cooled and filtered to separate the silver salt. The filtrate was then concentrated at 50–55° C. under 1–2 mm. pressure to give a yellow syrupy solution of p-methylbenzyltrimethylammonium hydroxide.

The quaternary ammonium base was thermally decomposed in an apparatus arranged for low-pressure distillation through a short, wide bore delivery tube into a receiver cooled with solid carbon dioxide. The distilling flask, containing the above concentrated solution, was heated at 100° C. (external temperature) under 1–2 mm. initial pressure for approximately 15 minutes, during which time the pressure rose to 20 mm. as the active gas evolution took place. After this reaction had subsided, the residue in the reaction flask was a waxy solid, which was treated with methanol, giving a white solid material. Additional solid material in the form of lumps or thin films was isolated from the upper portions of the reaction flask, from the receiver, which also contained condensed trimethylamine, and from a cold trap between the receiver and the vacuum pump. The solid in the reaction flask had a melting point in the range of 200–300° C. It was incompletely dissolved by the following solvents at their boiling points: methanol, benzene, chloroform, xylene, carbon disulfide, dimethylformamide and tetramethylenesulfone, but did dissolve in boiling benzyl benzoate and in a commercial mixture of chlorinated aromatic hydrocarbons below the boiling point. These properties indicated the polymeric nature of this material, which was further identified as poly-p-xylylene by its composition, carbon 91.88% and hydrogen 7.70% (calculated for $(C_8H_8)_x$: C, 92.26%; H, 7.74%). The polymer which had collected in the cold portions of the apparatus (probably through intermediate formation and volatilization of p-xylylene "monomer")

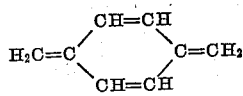

was examined by infrared absorption spectroscopy and X-ray diffraction and found to be identical with poly-p-xylylene obtained by pyrolysis of p-xylene. These polymer fractions were more infusible than those in the reaction flask as they did not melt below 400° C. The poly-p-xylylene obtained in this experiment could be compression molded at 200° C. to form transparent, flexible films.

Substantially similar results were obtained by carrying out the thermal decomposition at a temperature of 50–60° C. and 1–2 mm. pressure throughout, or at an initial temperature of 60° C. and 2 mm. pressure initially, followed by addition of methanol and a second heating period at 120° C. and 2 mm. pressure.

*Example II*

In a flask provided with a reflux condenser, gas inlet tube and stirrer was placed 120 parts of p-methylbenzyl bromide, obtained by the bromination of p-xylene, and 350 parts of anhydrous ether. The solution was cooled to 0° C. and excess gaseous trimethylamine was bubbled into the stirred mixture until reaction was complete. The mixture was then filtered and the solid product washed with ether. There was obtained 148 parts (94% of the theory) of p-methylbenzyltrimethylammonium bromide as a white solid melting at 198–200° C. with decomposition as obtained and at 200° C. with decomposition after crystallization from acetonitrile or propionitrile.

*Analysis.*—Calculated for $C_{11}H_{18}NBr$: Br, 32.73%. Found: Br, 32.64%, 32.73%.

To a solution of 25 parts of p-methylbenzyltrimethylammonium bromide in 30 parts of carbon dioxide-free water was added the freshly prepared silver oxide from 25 parts of silver nitrate. The mixture was vigorously shaken for one hour, then filtered in a nitrogen atmosphere. The bromide-free aqueous solution of p-methylbenzyltrimethylammonium hydroxide was concentrated in a distilling apparatus under reduced pressure at a maximum temperature of 35° C. The residue was then heated to 150° C. at 35 mm. pressure until decomposition was essentially complete, at which point the pressure was lowered to 3 mm. and the reaction vessel was gently and briefly heated with a free flame. Extraction of the solid reactant product with acetone gave 5.7 parts (54% of the theory) of acetone-insoluble poly-p-xylylene, obtained as a light tan solid which softened at 300° C. Analyses showed that the product contained 92.06% carbon and 7.82% hydrogen.

*Example III*

A solution of 25 parts of p-methylbenzyltrimethylammonium bromide in 30 parts of freshly boiled water was shaken for one hour with 16 parts of silver oxide. The mixture was filtered under nitrogen and the filtrate was charged to a dropping funnel attached to the top of an electrically heated reaction vessel. The vessel was provided with a side arm to which was fitted a receiver cooled in a mixture of solid carbon dioxide and acetone. The aqueous solution of the quaternary ammonium hydroxide was added dropwise over a period of 35 minutes to the reaction vessel, maintained at an inside temperature of 120–160° C. and at atmospheric pressure. After completion of the addition, the temperature of the system was maintained for ten minutes. The solid deposited in the reaction vessel, the side arm and the receiver was extracted with methanol, giving 6.5 parts of insoluble poly-p-xylylene. The yield was 61% of the theory.

*Example IV*

The experiment described in Example III was repeated with the same amount of starting material and under the same conditions, except that the reaction vessel was surrounded by vapors of refluxing naphthalene, i. e., was kept at an outside temperature of 218° C., and was maintained at a pressure of 34–37 mm. of mercury throughout the reaction. The yield of poly-p-xylylene was 7 parts (66% of the theory).

*Example V*

A solution of 74 parts of p-methylbenzyl bromide and 48.5 parts of dimethylaniline in 240 parts of methyl ethyl ketone was allowed to stand at room temperature for 48 hours. The solvent was decanted from the oily material which had formed and addition of diethyl ether to the latter caused it to crystallize. There was obtained 78 parts (64% yield) of p-methylbenzyldimethylphenylammonium bromide,

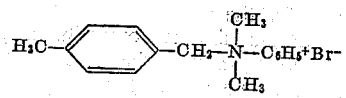

M. P. 120–122° C. after crystallization from propionitrile.

*Analysis.*—Calculated for $C_{16}H_{20}NBr$: N, 4.58%; Br, 26.09%. Found: N, 4.69%; Br, 25.42%.

A solution of 25 parts of p-methylbenzyldimethylphenylammonium bromide in 20 parts of freshly boiled water was shaken for one hour with 16 parts of silver oxide. The mixture was filtered under nitrogen and the filtrate, containing the p-methylbenzyldimethylphenylammonium hydroxide, was charged into the dropping funnel of the apparatus of Example IV. The aqueous solution of the quaternary ammonium hydroxide was added dropwise over a period of 35 minutes to the reaction vessel maintained at an outside temperature of 218° C. and at a pressure of 35 mm. of mercury. Poly-p-xylylene was obtained in 11% yield.

Example VI

To a cold solution of about 30 parts of trimethylamine in 125 parts of methyl ethyl ketone was added dropwise 44 parts of 1-chloromethyl-4-methylnaphthalene. The quaternary ammonium salt precipitated rapidly. After allowing the reaction mixture to stand for a few hours the solid was filtered in a dry atmosphere and washed with diethyl ether. There was obtained 57 parts (99% yield) of the methochloride of 1-methyl-4-(dimethylaminomethyl)naphthalene,

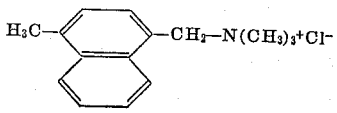

a very hygroscopic solid soluble in water and ethanol.

*Analysis.*—Calculated for $C_{15}H_{20}NCl$: Cl, 14.20%. Found: Cl, 13.98%, 14.02%.

To a solution of 25 parts of this quaternary ammonium salt in 30 parts of carbon dioxide-free water was added 16 parts of silver oxide. The mixture was vigorously shaken for one hour, then filtered in a nitrogen atmosphere. The aqueous solution of the quaternary ammonium hydroxide was concentrated in a distilling apparatus at reduced pressure and a maximum temperature of 30° C. The residue was then heated to 150° C. at 100 mm. mercury pressure until decomposition was essentially complete, at which point the pressure was lowered to 1 mm. and the reaction vessel was gently heated over a free flame. Extraction of the solid reaction product with water, then with methanol, gave 5 parts (32% yield) of poly-(1,4-dimethylenenaphthalene),

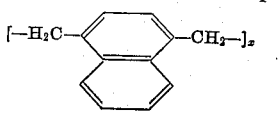

soluble in boiling benzyl benzoate.

*Analysis.*—Calculated for $(C_{12}H_{10})_x$: C, 93.46%; H, 6.54%. Found: C, 92.91%; H, 6.54%.

Example VII

To a solution of excess trimethylamine in 350 parts of diethyl ether was added 100 parts of 3-chloro-4-methylbenzyl chloride. After allowing the reaction mixture to stand at room temperature for four days, the quaternary ammonium salt which had formed was isolated by filtration in an atmosphere of dry nitrogen. There was obtained 98 parts (73% yield) of 3-chloro-4-methylbenzyltrimethylammonium chloride,

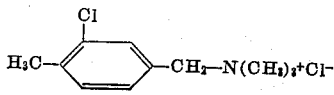

as a very hygroscopic white powder, M. P. 198–200° C.

*Analysis.*—Calculated for $C_{11}H_{17}NCl_2$: N, 5.98%. Found: N, 6.03%, 6.09%.

This quaternary ammonium chloride was converted to the hydroxide by the procedure of Example VI, and the quaternary ammonium hydroxide was decomposed at a temperature of 130–150° C. under a pressure of 1–5 mm. mercury. The residual solid material was extracted with water, then with methanol to give a 13.5% yield of poly-(2-chloro-p-xylylene),

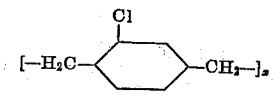

as a tan powder soluble in boiling benzyl benzoate, from which it reprecipitated on cooling.

*Analysis.*—Calculated for $(C_8H_7Cl)_x$: C, 69.32%; H, 5.09%. Found: C, 69.06%; H, 5.51%.

While the process of this invention has been illustrated with reference to the thermal decomposition of certain specific quaternary ammonium hydroxides, it is generic to the preparation of polyarylenethylenes by the thermal decomposition of quaternary ammonium hydroxides of the formula

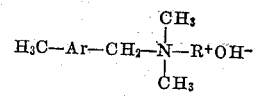

wherein Ar is an arylene or halogenoarylene radical having its free valences in the para positions and R is methyl or phenyl. Additional examples of suitable quaternary ammonium hydroxides are the methohydroxides of the following tertiary amines (i. e., the compounds $A-CH_3\ ^+OH^-$, where A is the tertiary amine): 2-fluoro-4-methyl-1-(dimethylaminomethyl)-benzene; 3-iodo-4-methyl-1-(dimethylaminomethyl)benzene; 3-bromo-4-methyl-1-(dimethylaminomethyl)naphthalene; 3,5-dichloro-4-methyl-1-(dimethylaminomethyl)benzene; 4-methyl-1-(methylphenylaminomethyl)naphthalene; 3,6-dichloro-4-methyl-1-(dimethylaminomethyl)naphthalene; 9-methyl-10-(dimethylaminomethyl)anthracene; 4-methyl-1-(dimethylaminomethyl)phenanthrene; and the like. The methyl group and the methylene group attached to the quaternary ammonium hydroxide group are in the 1 and 4 positions of the same arylene nucleus.

The preferred starting materials are those in which the arylene nucleus is of one to two benzene nuclei and is either unsubstituted or substituted by a single halogen atom, preferably a halogen of atomic number 9–17 inclusive, i. e., fluorine or chlorine.

The process of this invention is susceptible of many variations which will be apparent to the skilled chemist. For example, it can be made semi-continuous or continuous with suitably designed equipment. Moreover, the quaternary ammonium base can be prepared in a continuous manner by ion exchange methods, rather than as described in the examples.

The polyarylenethylenes and halogenopolyarylenethylenes obtainable by the process of this invention are technically valuable polymers which are susceptible of many applications, particularly in the field of flexible films for packaging. The most useful, because most readily accessible, of these products is poly-p-xylylene.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of polymers wherein p-methylbenzyltrimethylammonium hydroxide is thermally decomposed and the polymer having recurring —CH₂—C₆H₄—CH₂— units resulting from said thermal decomposition is separated.

2. A process for the preparation of polymers wherein p-methylbenzyltrimethylammonium hydroxide is heated at a temperature of at least 45° C. and the polymer having recurring —CH₂—C₆H₄—CH₂— units resulting from said heating is isolated.

3. A process for the preparation of polymers wherein p-methylbenzyltrimethylammonium hydroxide is heated at a temperature of at least 45° C. under reduced pressure and the polymer having recurring –CH₂–C₆H₄–CH₂– units resulting from said heating is isolated.

4. A process for the preparation of polymers wherein a quaternary ammonium hydroxide having, para to a methyl group on an aromatic hydrocarbon nucleus wherein any other substitutent is halogen, a methylene group attached to a quaternary ammonium nitrogen whose remaining valences are attached to one hydroxyl group, at least two methyl groups, and, at most, one phenyl group, is thermally decomposed and the polymer resulting from said thermal decomposition is separated.

5. A process for the preparation of polymers wherein a quaternary ammonium hydroxide having, para to a methyl group on a benzene ring, wherein any other substituent is halogen, a methylene group attached to a quaternary ammonium nitrogen whose remaining valences are attached to one hydroxyl group, at least two methyl groups, and, at most, one phenyl group, is thermally decomposed and the polymer resulting from said thermal decomposition is separated.

6. A process for the preparation of polymers wherein a quaternary ammonuim hydroxide having, para to a methyl group on a benzene ring free from other substitutents, a methylene group attached to a quaternary ammonium nitrogen whose remaining valences are attached to one hydroxyl group, at least two methyl groups, and, at most, one phenyl group, is thermally decomposed and the polymer resulting from said thermal decomposition is separated.

7. A process for the preparation of polymers wherein a quaternary ammonium hydroxide having, para to a methyl group on a benzene ring, wherein any other substituent is halogen, a methylene group attached to a trimethylammonium hydroxide group, is thermally decomposed and the polymer resulting from said thermal decomposition is separated.

References Cited in the file of this patent

FOREIGN PATENTS

| | | |
|---|---|---|
| 647,111 | Great Britain | Dec. 6, 1950 |
| 650,947 | Great Britain | Mar. 7, 1951 |

OTHER REFERENCES

Lucas: "Organic Chemistry," page 289, American Book Co. (1935).